United States Patent
Zheng et al.

(10) Patent No.: US 9,519,163 B2
(45) Date of Patent: Dec. 13, 2016

(54) TUNABLE SILICON GRATING COUPLERS (71) Applicant: Oracle International Corporation, Redwood City, CA (US)

(72) Inventors: Xuezhe Zheng, San Diego, CA (US); Jin Yao, San Diego, CA (US); Guoliang Li, San Diego, CA (US); Ying L. Luo, San Diego, CA (US); John E. Cunningham, San Diego, CA (US); Ashok V. Krishnamoorthy, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 97 days.

(21) Appl. No.: 14/034,950

(22) Filed: Sep. 24, 2013

(65) Prior Publication Data
US 2015/0086149 A1 Mar. 26, 2015

(51) Int. Cl.
*G02F 1/025* (2006.01)
*G02B 6/24* (2006.01)
*G02F 1/015* (2006.01)

(52) U.S. Cl.
CPC .............. *G02F 1/025* (2013.01); *G02B 6/24* (2013.01); *G02F 2001/0154* (2013.01); *G02F 2201/302* (2013.01)

(58) Field of Classification Search
CPC .............. G02F 1/025; G02F 2001/0154; G02F 2001/302; G02B 6/24
USPC ............................................................. 385/2
See application file for complete search history.

(56) References Cited

U.S. PATENT DOCUMENTS

| | | | | |
|---|---|---|---|---|
| 4,006,963 A * | 2/1977 | Baues | ................ | G02F 1/295 385/10 |
| 4,343,536 A * | 8/1982 | Watanabe | ............ | G02F 1/0018 359/315 |
| 4,532,632 A * | 7/1985 | Yamashita | ........... | H01S 3/1055 359/305 |
| 5,319,491 A * | 6/1994 | Selbrede | ................. | G02B 6/00 345/206 |
| 5,337,183 A * | 8/1994 | Rosenblatt | ............... | G02F 1/01 359/245 |
| 5,625,729 A * | 4/1997 | Brown | .................... | G02B 6/34 359/573 |
| 6,215,928 B1* | 4/2001 | Friesem | ................. | G02F 1/025 372/102 |
| 6,563,985 B2* | 5/2003 | Yin et al. | ......................... | 385/37 |
| 6,628,850 B1* | 9/2003 | Yao | ........................ | G02B 6/124 385/10 |
| 6,714,575 B2* | 3/2004 | Evans | ........................ | 372/50.1 |

(Continued)

OTHER PUBLICATIONS

Zaoui et al., CMOS-Compatible Polarization Splitting Grating Couplers With a Backside Metal Mirror, IEEE Photonics Technology Letters, vol. 25, No. 14, Jul. 15, 2013.*

*Primary Examiner* — Peter Radkowski
(74) *Attorney, Agent, or Firm* — Park, Vaughan, Fleming & Dowler LLP (57) ABSTRACT

A photonic integrated circuit (PIC) is described. This PIC includes a grating coupler for surface-normal coupling that has an alternating pattern of grating teeth and grating trenches, where the grating trenches are filled with an electro-optical material. By applying an electric potential to the grating teeth, the index of refraction of the electro-optical material can be modified.

16 Claims, 8 Drawing Sheets

(56) References Cited

U.S. PATENT DOCUMENTS

| | | | |
|---|---|---|---|
| 7,181,107 B2* | 2/2007 | Martinez | 385/37 |
| 8,805,136 B2* | 8/2014 | El-Sherif | 385/37 |
| 2002/0008913 A1* | 1/2002 | Yin et al. | 359/578 |
| 2002/0136259 A1* | 9/2002 | Evans | 372/102 |
| 2003/0052081 A1* | 3/2003 | Koops | G02B 6/1221 |
| | | | 216/24 |
| 2009/0290837 A1* | 11/2009 | Chen | G02B 6/34 |
| | | | 385/37 |

* cited by examiner

TUNABLE SILICON GRATING COUPLERS

GOVERNMENT LICENSE RIGHTS

This invention was made with United States government support under Agreement No. HR0011-08-9-0001 awarded by DARPA. The United States government has certain rights in the invention.

BACKGROUND

Field

The present disclosure generally relates to the design of photonic integrated circuits (PICs). More specifically, the present disclosure relates to a PIC that includes a tunable grating coupler.

Related Art

Figure 1:
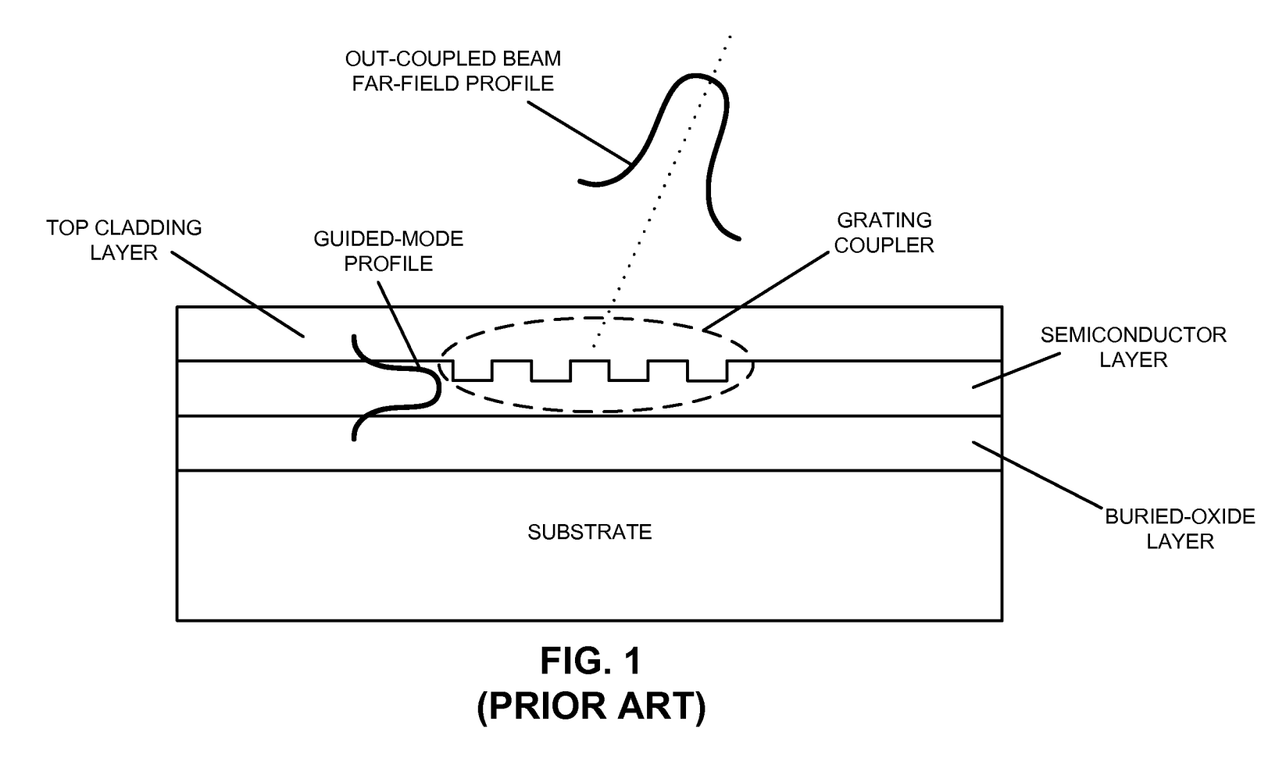
FIG. 1 is a block diagram illustrating a side view of an existing integrated circuit with a grating coupler.

Grating couplers are important silicon-photonic optical components because they can be used as an input/output (I/O) optical device for optical waveguide-to-fiber surface-normal coupling, as well as for inter-layer optical waveguide-to-optical waveguide coupling on the same chip or between two different chips. A grating coupler enables high-density interconnects, two-dimensional I/O from the surface of a silicon chip, multi-wavelength operation, and the ability to perform wafer-scale testing and binning before the reticles or chips are separated from the wafer. However, these many useful and necessary features often cannot be individually optimized. Consequently, there are typically significant tradeoffs that limit their use in broad-spectrum, wavelength-division-multiplexing (WDM) interconnects, including: manufacturing tolerances, wavelength-passband, lateral and angular alignment tolerances, and optical loss. FIG. 1 presents a block diagram illustrating a side view of an existing integrated circuit with a grating coupler on a silicon optical waveguide for surface-normal coupling.

For a given wavelength λ, when the phase-matching condition in Eqn. 1 is met, the optical mode inside the optical waveguide is coupled out of the optical waveguide at a coupling angle θ with respect to the vertical, or vice versa. In particular, $$k\sin(\theta) + p\frac{2\pi}{\Lambda} = \beta \quad (1)$$

where $k=2\pi/\lambda$ is the modulus of the out-coupled wave vector, p is the diffraction order, Λ is the grating period, $\beta=(2\pi/\lambda)\cdot n_{\mathit{eff}}$ is the real part of the propagation constant and $n_{\mathit{eff}}$ is the mean effective index of refraction along one grating period.

In order to obtain high-diffraction efficiency (i.e., low coupling loss) for a receiving optical device having a fixed receiving angle, the grating period Λ is usually selected so that there is only one diffraction order that satisfies the phase-matching condition for the selected wavelength λ. Such a grating coupler is a wavelength-sensitive optical device. For a given grating period Λ and an effective index of refraction $n_{\mathit{eff}}$, the phase-matching angle θ is different for different wavelengths, resulting in different coupling loss to a fixed receiving optical device. Similarly, because of manufacturing tolerances, $n_{\mathit{eff}}$ can vary from grating coupler-to-grating coupler and from wafer to wafer, which in turn causes center-wavelength uncertainty for the grating couplers. Consequently, in order to achieve the targeted center wavelength, and to avoid bandwidth narrowing because of center-wavelength variation in a system that uses pre-selected wavelength band(s), or in applications where grating couplers are used for optical waveguide-to-optical waveguide coupling, very tight tolerance control is usually required on both the silicon-layer thickness in silicon-on-insulator (SOI) wafers (which are used to implement silicon photonic components) and the grating trench etch depth. However, it is very difficult to achieve the desired center-wavelength accuracy, because the silicon layer thickness of an SOI wafer typically varies a few percent across the wafer and from wafer to wafer. In addition, there is often a variation of a few nanometers in the etch depth of grating trenches in a grating coupler. Therefore, for a grating coupler on a sub-micron SOI platform, both of the aforementioned variations can cause the center wavelength to deviate from the desired center wavelength by a few to tens of nanometers.

Hence, what is needed is a grating coupler without the problems described above.

SUMMARY

One embodiment of the present disclosure provides an integrated circuit that includes a substrate and a buried-oxide layer disposed on the substrate. Moreover, the integrated circuit includes a semiconductor layer, disposed on the buried-oxide layer, having a top surface. Furthermore, the integrated circuit includes a grating coupler, disposed on the semiconductor layer, having an alternating pattern of grating trenches and grating teeth adjacent to the grating trenches, where the grating trenches are etched at least partially from the top surface toward the buried-oxide layer, and the grating trenches are filled with an electro-optical material. By applying an electric potential to the grating teeth, the electric potential is applied across the electro-optical material to modify an index of refraction of the electro-optical material.

Note that modifying the index of refraction changes: an operating wavelength of the grating coupler, a position alignment criterion of the grating coupler, and/or an angular alignment criterion of the grating coupler.

Moreover, the semiconductor layer under the grating teeth includes one of an n-type dopant and a p-type dopant. Alternatively, the semiconductor layer under the grating teeth includes a p-type dopant and an n-type dopant, and the p-type dopant is included under alternating grating teeth and the n-type dopant is included under grating teeth interposed between the alternating grating teeth. In this embodiment, the electric potential reverse biases pn-junctions in the semiconductor layer to deplete carriers.

In some embodiments, the grating trenches are etched from the top surface to the buried-oxide layer.

Furthermore, the substrate, the buried-oxide layer and the semiconductor layer may comprise a silicon-on-insulator technology. For example, the semiconductor layer may include silicon.

Another embodiment provides a system that includes the integrated circuit.

Another embodiment provides a method for adjusting the operating wavelength of the grating coupler. During the method, the operating wavelength of the grating coupler is measured. Then, the electric potential to apply to the grating teeth of the grating coupler, disposed on the semiconductor layer, is determined, where the grating coupler includes the alternating pattern of grating trenches and the grating teeth adjacent to the grating trenches, and the grating trenches are etched at least partially from the top surface of the semiconductor layer toward the buried-oxide layer beneath the semiconductor layer. Moreover, the grating trenches are filled with the electro-optical material, and the electric potential modifies the index of refraction of the electro-optical material. Next, the electric potential is applied to the grating teeth.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a photonic integrated circuit (PIC) that includes a tunable grating coupler, a system that includes the PIC, and a method for adjusting an operating wavelength of the tunable grating coupler are described. This PIC includes the grating coupler for surface-normal coupling that has an alternating pattern of grating teeth and grating trenches, where the grating trenches are filled with an electro-optical material. By applying an electric potential to the grating teeth, the index of refraction of the electro-optical material can be modified.

Using the tunable grating coupler, a larger optical bandwidth may be achieved. In addition, the grating coupler may be tuned to change: an operating or center wavelength of the grating coupler, a position alignment criterion of the grating coupler, and/or an angular alignment criterion of the grating coupler.

We now describe embodiments of the PIC (which is sometimes referred to as a 'chip'). In this PIC, a posteriori adjustments may be made to an 'as-manufactured' grating coupler to improve the tradeoffs between: the alignment tolerance, the wavelength tolerance, and the optical loss. This capability may facilitate an improvement in the performance and the grating-coupler yield for a given alignment condition and wavelength range.

In particular, the center or operating wavelength and the diffraction angle of the grating coupler may be tuned. As indicated by Eqn. 1, for a fixed grating period Λ, changing $n_{eff}$ results in a different phase-matching angle θ. Note that $n_{eff}$ is the mean effective index of refraction of the grating trench and the grating tooth within one grating period Λ. By filling the trenches of a grating coupler with an electro-optical material (such as polymers on silicon, polycrystalline ferro-electrical materials, barium titanate, lithium niobate, or a variety of semiconductor materials), and using the grating teeth as electrodes to apply an electric field to the filled electro-optical material, the mean effective index of refraction of the grating coupler can be tuned and, consequently, the diffraction angle of a selected wavelength or the center wavelength at a fixed phase-matching angle can be adjusted.

Figure 2:
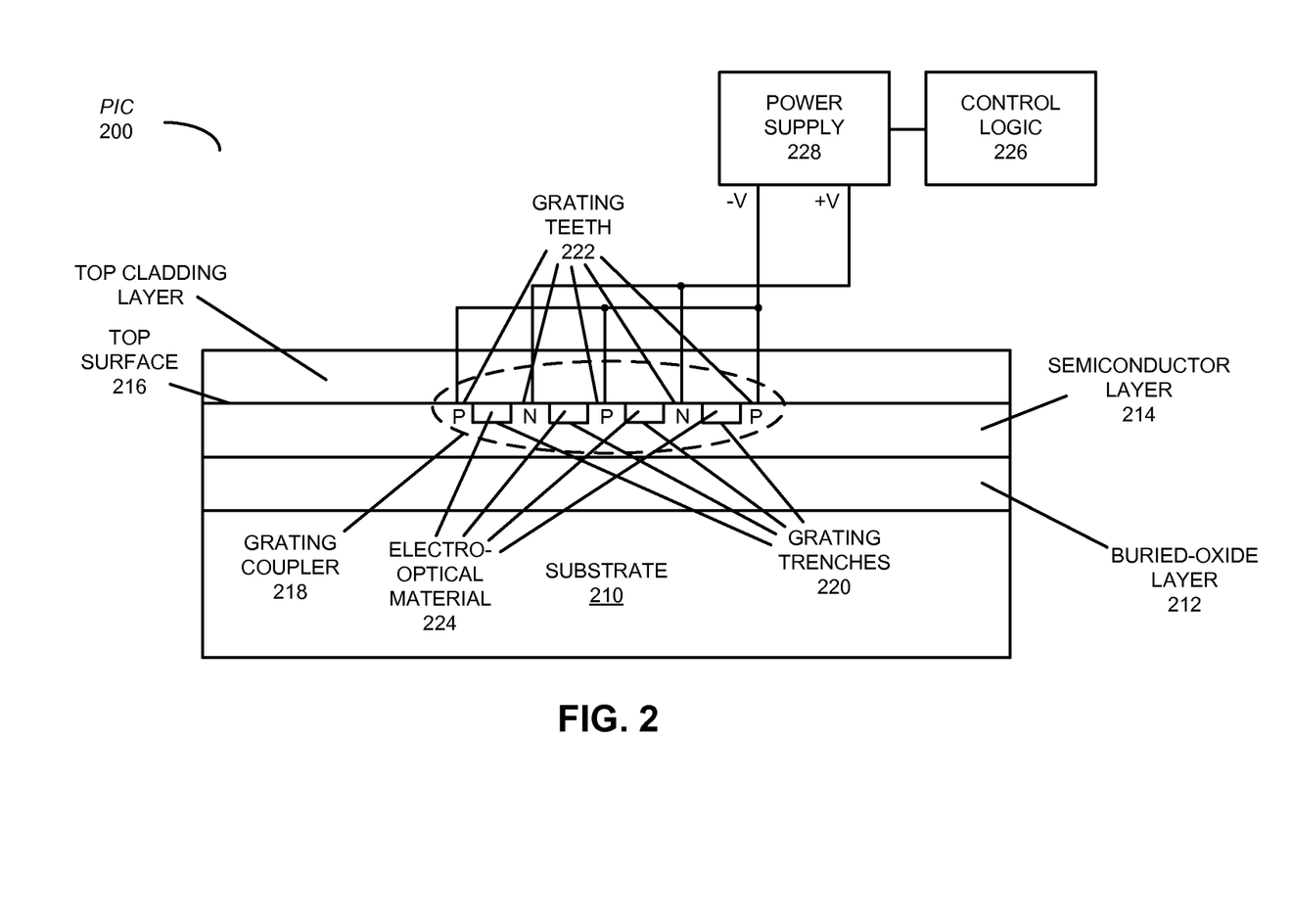
FIG. 2 is a block diagram illustrating a side view of a photonic integrated circuit (PIC) with a grating coupler in accordance with an embodiment of the present disclosure.
Figure 3:
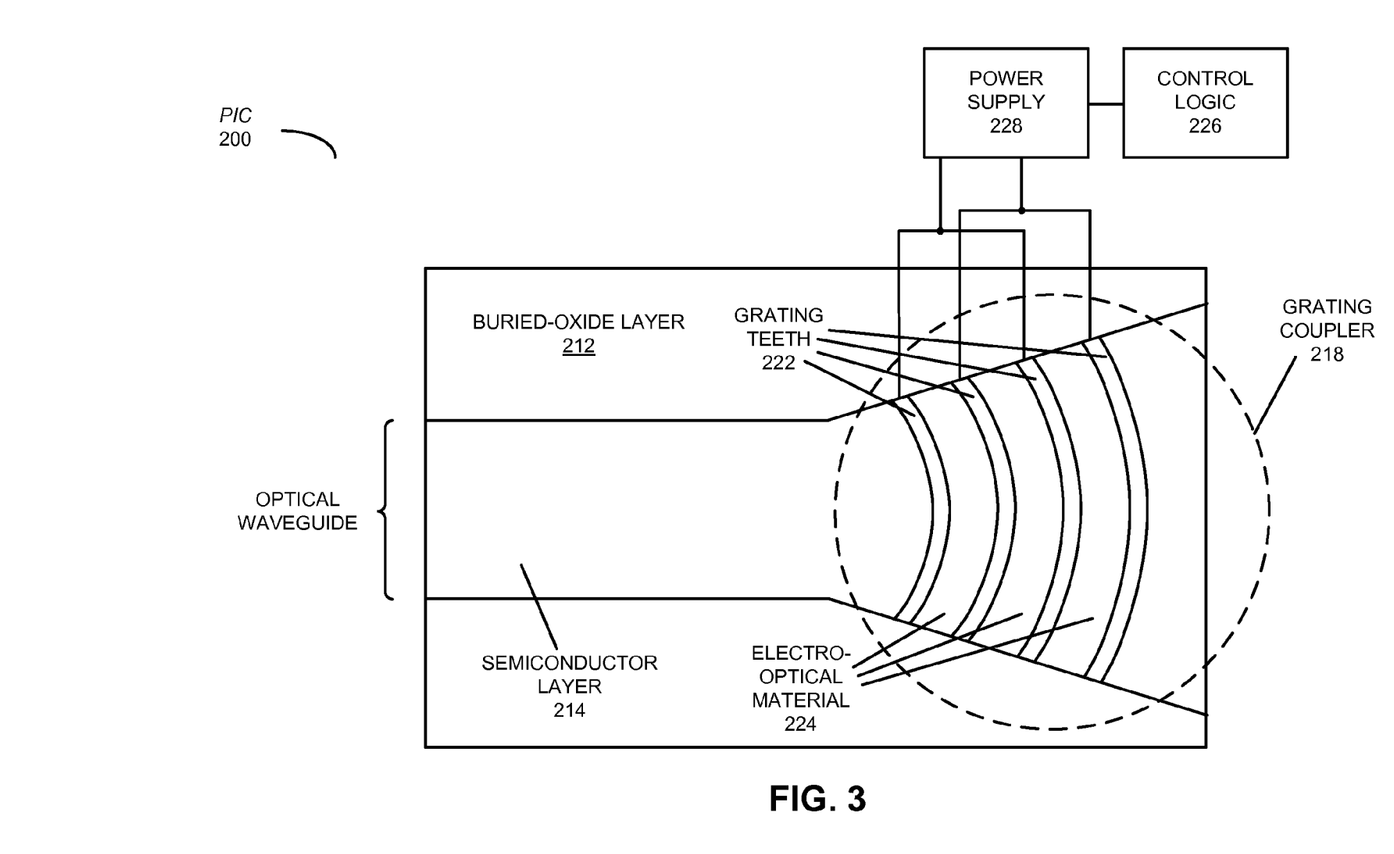
FIG. 3 is a block diagram illustrating a top view of the PIC of FIG. 2 in accordance with an embodiment of the present disclosure.

FIG. 2 presents a block diagram illustrating a side view of a PIC 200 with a grating coupler 218, and FIG. 3 presents a block diagram illustrating a top view of PIC 200. This PIC includes: a substrate 210 and a buried-oxide layer 212 disposed on substrate 210. Moreover, PIC 200 includes a semiconductor layer 214, disposed on buried-oxide layer 212, having a top surface 216. Furthermore, PIC 200 includes grating coupler 218, disposed on semiconductor layer 214, having an alternating pattern of grating trenches 220 and grating teeth 222 adjacent to grating trenches 220, where grating trenches 220 are etched at least partially from top surface 216 toward buried-oxide layer 212, and grating trenches 220 are filled with an electro-optical material 224. By applying an electric potential to grating teeth 222 (for example, using control logic 226, which implements a look-up table of predetermined wavelengths, angles or alignment tolerances as a function of electric potential, and power supply 228), the electric potential is applied across electro-optical material 224 to modify an index of refraction of electro-optical material 224.

Note that modifying the index of refraction changes: an operating wavelength of grating coupler 218, a position alignment criterion of grating coupler 218, and/or an angular alignment criterion of grating coupler 218.

As shown in FIG. 2, semiconductor layer 214 under grating teeth 222 includes a p-type dopant and an n-type dopant, and the p-type dopant is included under alternating grating teeth and the n-type dopant is included under grating teeth interposed between the alternating grating teeth. For example, the n-type dopant may have a concentration of $3 \cdot 10^{17}$ carriers/cm$^3$ and the p-type dopant may have a concentration of $3 \cdot 10^{17}$ carriers/cm$^3$. In this embodiment, the electric potential reverse biases pn-junctions in semiconductor layer 214 to deplete carriers. Consequently, the grating coupler 218 is sensitive to the polarity of the electric potential.

Furthermore, substrate 210, buried-oxide layer 212 and semiconductor layer 214 may comprise a silicon-on-insulator technology. For example, semiconductor layer 214 may include silicon. Note that semiconductor layer 214 may have a thickness that is less than 2 µm (such as 200-300 nm). Additionally, buried-oxide layer 212 may have a thickness between 0.3 and 3 µm (such as 0.8 µm), the grating period Λ is 600 nm, the width of one of grating trenches 220 is 100-300 nm, the depth of grating trenches 220 is 25-75% of the thickness of semiconductor layer 214 (such as 70-220 nm), the wavelength λ is 1.28-1.55 µm (such as 1.3 µm), and the electrical potential is less than 10 V.

In an exemplary embodiment, grating teeth 222 (which may be silicon) are slightly wider than in normal grating-coupler designs, and are doped as electrodes with an alternating p-type and n-type pattern. Contacts may be made with these electrodes at the edge of grating teeth 222. Note that all the p-type electrodes and all the n-type electrodes, respectively, can be connected together at the upper metal layer through vias. Applying the reverse-bias electric potential to the p-type electrodes and the n-type electrodes results in a strong electric field applied to electro-optical material 224 filled in grating trenches 220, which in turn changes the index of refraction electro-optical material 224 and the $n_{eff}$ of grating coupler 218. Grating trenches 220 may have widths ranging from approximately 100-300 nm. With such narrow grating trenches, an electric field of greater than 1e7 V/cm can be achieved with an electric potential of less than 3 V. If grating trenches 220 are chirped for an optimized output field profile, the p-type electrodes and the n-type electrodes may be separated and different electric potentials may be applied proportional to the width of a given grating trench to achieve a uniform electric field.

Figure 4:
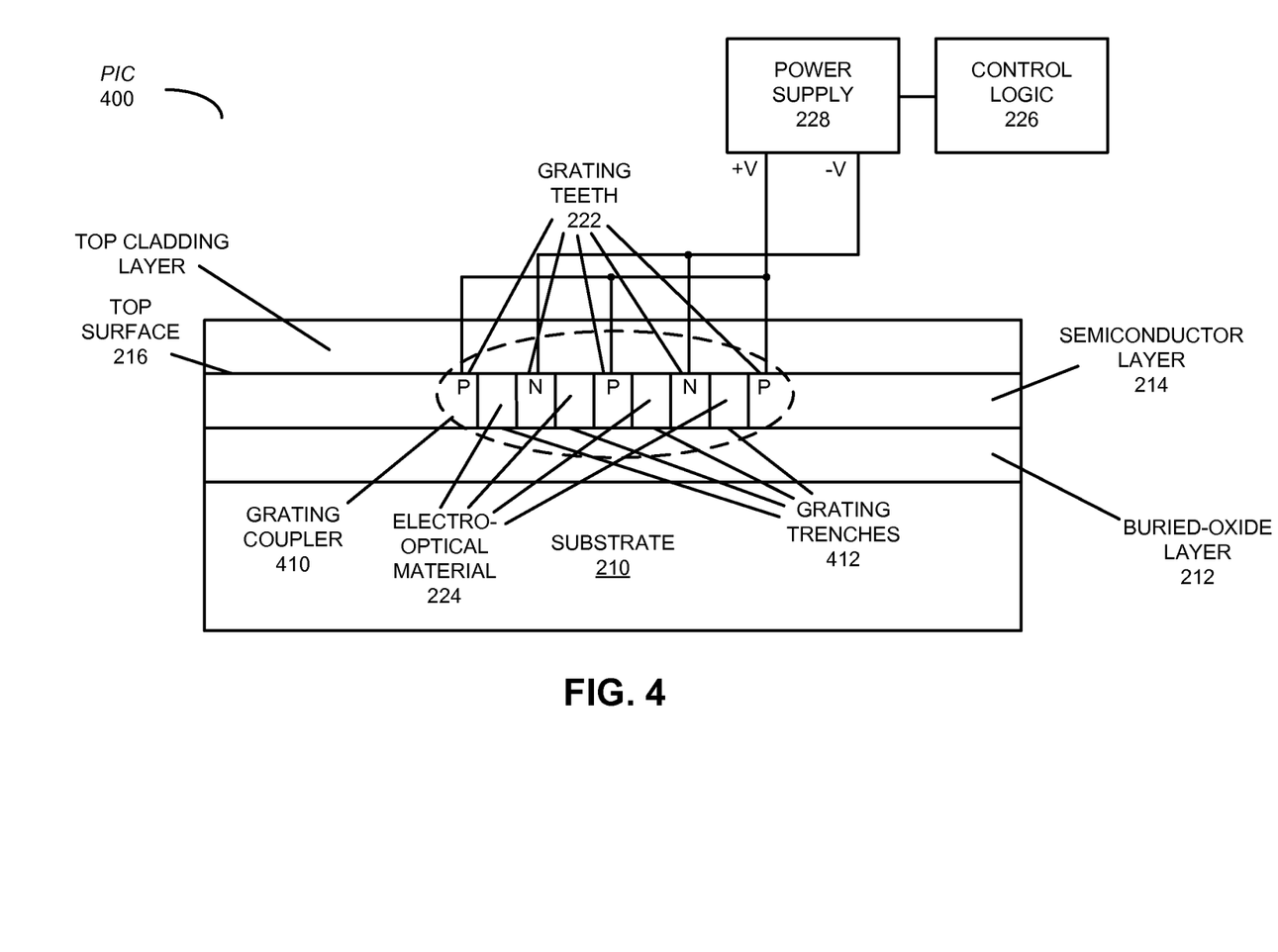
FIG. 4 is a block diagram illustrating a side view of a PIC with a grating coupler in accordance with an embodiment of the present disclosure.

While grating trenches 220 are etched at least partially from top surface 216 toward buried-oxide layer 212 in PIC 200, in other embodiments the grating trenches are etched all the way from top surface 216 to buried-oxide layer 212. This is shown in FIG. 4, which presents a block diagram illustrating a side view of a PIC 400 with a grating coupler 410. By etching grating trenches 412 all the way to buried-oxide layer 212, grating teeth 222 are completely isolated. Consequently, either a forward or a reverse-bias electric potential can be applied to achieve a strong electric field across electro-optical material 224 filled in grating trenches 412.

Figure 5:
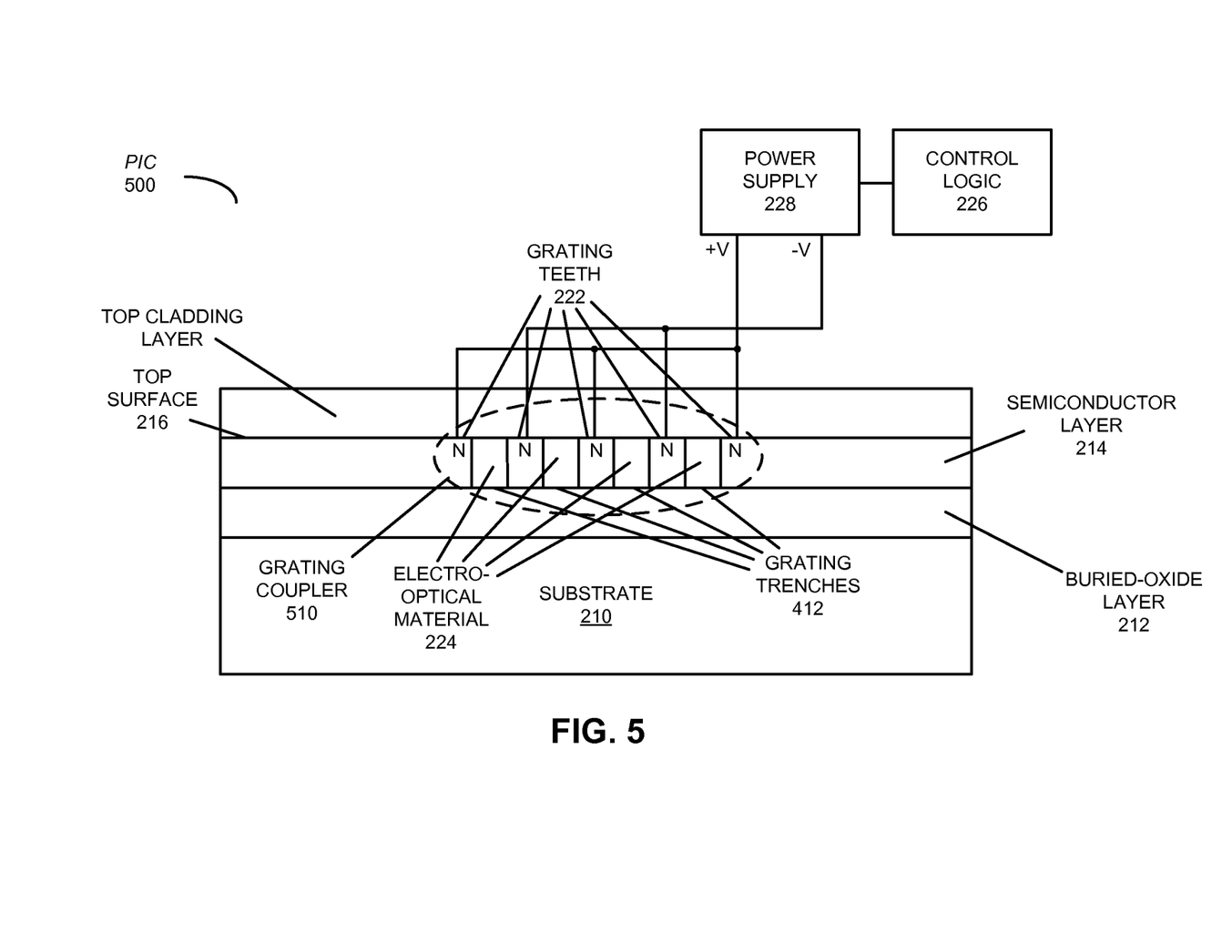
FIG. 5 is a block diagram illustrating a side view of a PIC with a grating coupler in accordance with an embodiment of the present disclosure.

In order to reduce the free-carried absorption loss, only n-type doping may be used under grating teeth 222. This is shown in FIG. 5, which presents a block diagram illustrating a side view of a PIC 500 with a grating coupler 510. However, in other embodiments only p-type doping may be used under grating teeth 222.

Figure 6:
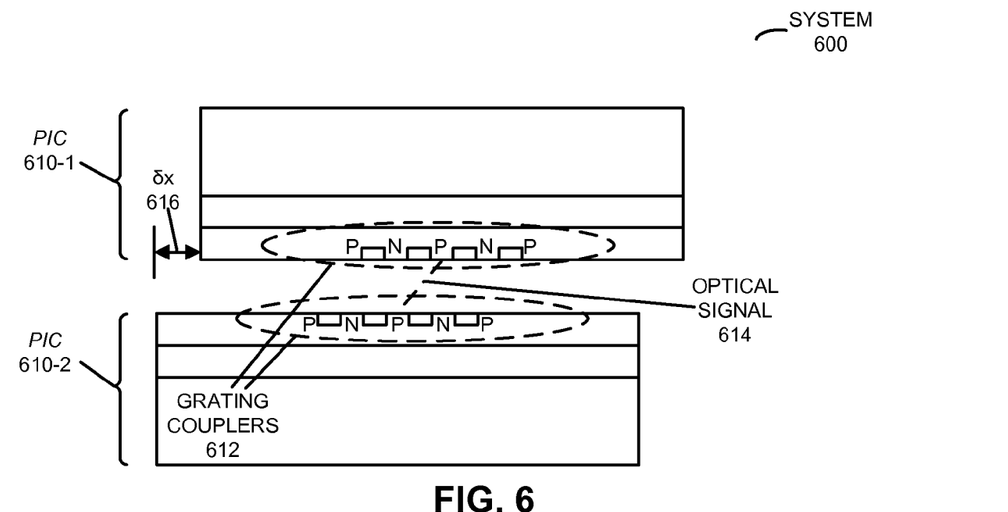
FIG. 6 is a block diagram illustrating a side view of an alignment of grating couplers in a system that includes PICs in accordance with an embodiment of the present disclosure.

We now describe the system. FIG. 6 presents a block diagram illustrating a side view of an alignment of grating couplers 612 in a system 600 that includes PICs 610, such as PIC 200 (FIGS. 2 and 3), PIC 400 (FIG. 4) or PIC 500 (FIG. 5). In this system, PICs 610 have top surfaces that face each other. These PICs 610 convey optical signal 614 between PICs 610 using surface-normal optical proximity communication.

Figure 7:
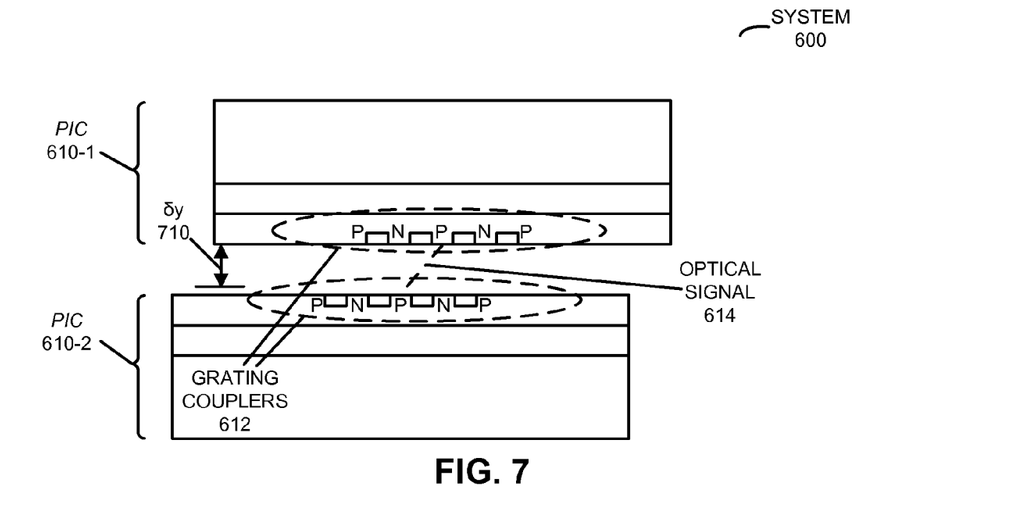
FIG. 7 is a block diagram illustrating a side view of an alignment of the grating couplers in the system of FIG. 6 in accordance with an embodiment of the present disclosure.

Note that tuning the grating-coupling center or operating wavelength for a fixed phase-matching angle can be used to compensate for the center-wavelength offset associated with manufacturing tolerances or ambient temperature change. The tuning can also be used to compensate for misalignment in applications in which grating couplers are used for inter-layer optical waveguide-to-optical waveguide coupling. As shown in FIG. 6, grating couplers 612 with a fixed diffraction angle are designed for surface-normal coupling at a fixed gap and center-to-center offset. Misalignment in the lateral direction (ax) 616 can be compensated for by tuning the phase-matching angle of grating couplers 612 from an original angle to a new angle. Similarly, as shown in FIG. 7, which presents a block diagram illustrating a side view of an alignment of grating couplers 612 in a system 600, misalignment in vertical direction 710 (δy) can be compensated for by tuning the phase-matching angle of grating couplers 612 from an original angle to a new angle.

In an exemplary embodiment, lateral or vertical alignment of the grating coupler without tuning is ±0.25 μm, and the angular alignment of the grating coupler without tuning is ±1°. When the grating coupler is electrically tuned, the angular alignment of the grating coupler is ±3°. In addition, the electrical tuning may result in a 5% change in $n_{eff}$ which results in a ±7 nm change in a wavelength λ of 1550 nm.

Applications of grating couplers 612 include in-situ re-alignment of chips in packages or even dynamic alignment (versus temperature) of chips to optimize the optical coupling between the chips. Moreover, grating couplers 612 may be used in applications, such as: chip-to-chip optical coupling, optical proximity communication (where the separation between chips is less than the wavelength λ), input/output (I/O) testing, and hybrid optical sources.

Note that system 600 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, and/or another electronic computing device. In some embodiments, the computer system may be at one location or may be distributed over multiple, geographically dispersed locations.

Moreover, the preceding embodiments of the PIC and/or the system may include fewer components or additional components. Moreover, the substrates may include: a semiconductor die (such as silicon), a ceramic, an organic material and/or glass.

Although the PICs and the system are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. In addition, functionality in the preceding embodiments may be implemented more in hardware and less in software, or less in hardware and more in software, as is known in the art.

Note that components in the preceding embodiments of the PIC and the system may be fabricated using a wide variety of techniques, as is known to one of skill in the art, including silicon-machining techniques, such as wet etching and dry etching.

Figure 8:
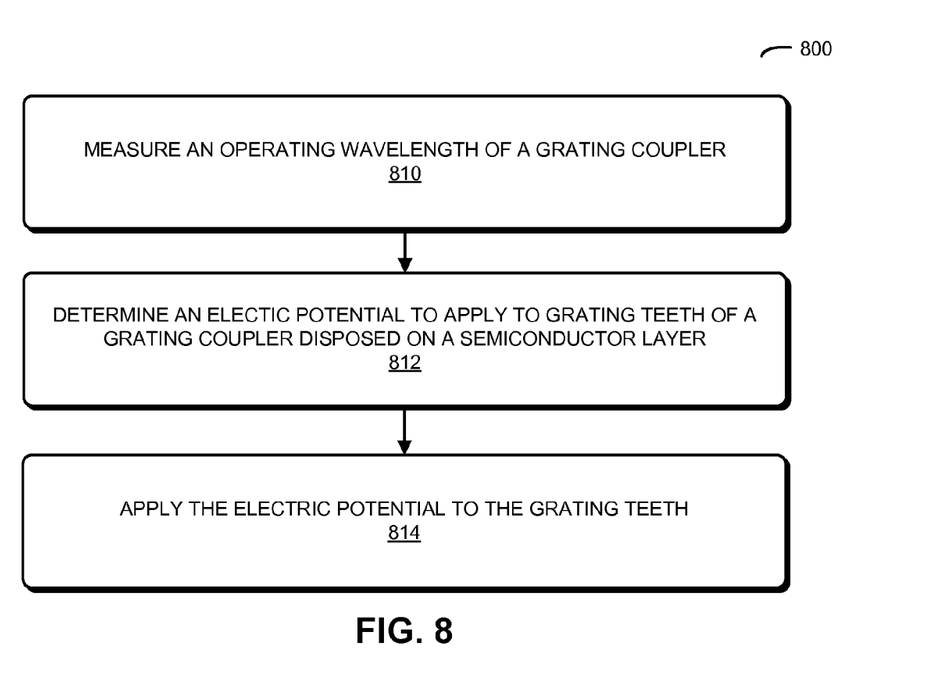
FIG. 8 is a flow diagram illustrating a method for adjusting an operating wavelength of a grating coupler in a PIC in accordance with an embodiment of the present disclosure.

We now describe the method. FIG. 8 presents a flow diagram illustrating a method 800 for adjusting an operating wavelength of a grating coupler in a PIC, such as PIC 200 (FIGS. 2 and 3), PIC 400 (FIG. 4) or PIC 500 (FIG. 5). During the method, an operating wavelength of the grating coupler is measured (operation 810). Then, an electric potential to apply to grating teeth of the grating coupler, disposed on a semiconductor layer, is determined (operation 812), where the grating coupler includes an alternating pattern of grating trenches and the grating teeth adjacent to the grating trenches, and the grating trenches are etched at least partially from a top surface of the semiconductor layer toward a buried-oxide layer beneath the semiconductor layer. Moreover, the grating trenches are filled with an electro-optical material, and the electric potential modifies an index of refraction of the electro-optical material. Next, the electric potential is applied to the grating teeth (operation 814).

In some embodiments of method 800, there may be additional or fewer operations. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
   a substrate;
   a buried-oxide layer disposed on the substrate;
   a semiconductor layer, disposed on the buried-oxide layer, having a top surface; and
   a grating coupler, disposed in the semiconductor layer, having an alternating pattern of grating trenches and grating teeth adjacent to the grating trenches, wherein the grating coupler is a portion of the semiconductor layer, and wherein the grating trenches extend all the way through the semiconductor layer from the top surface to the buried-oxide layer;
   wherein the grating trenches are filled with an electro-optical material; and
   wherein the grating teeth are configured as electrodes to apply an electric potential across the electro-optical material to modify an index of refraction of the electro-optical material.

2. The integrated circuit of claim 1, wherein the modification to the index of refraction changes one of: an operating wavelength of the grating coupler, a position alignment criterion of the grating coupler, and an angular alignment criterion of the grating coupler.

3. The integrated circuit of claim 1, wherein the semiconductor layer under the grating teeth includes one of: an n-type dopant and a p-type dopant.

4. The integrated circuit of claim 1, wherein the semiconductor layer under the grating teeth includes a p-type dopant and an n-type dopant; and
   wherein the p-type dopant is included under alternating grating teeth and the n-type dopant is included under grating teeth interposed between the alternating grating teeth.

5. The integrated circuit of claim 4, wherein the electric potential reverse biases pn-junctions in the semiconductor layer to deplete carriers.

6. The integrated circuit of claim 1, wherein the grating trenches are etched from the top surface to the buried-oxide layer.

7. The integrated circuit of claim 1, wherein the substrate, the buried-oxide layer and the semiconductor layer comprise a silicon-on-insulator technology.

8. The integrated circuit of claim 1, wherein the semiconductor layer includes silicon.

9. A system, comprising an integrated circuit, wherein the integrated circuit includes:
   a substrate;
   a buried-oxide layer disposed on the substrate;
   a semiconductor layer, disposed on the buried-oxide layer, having a top surface; and
   a grating coupler, disposed in the semiconductor layer, having an alternating pattern of grating trenches and grating teeth adjacent to the grating trenches, wherein the grating coupler is a portion of the semiconductor layer, and wherein the grating trenches extend all the way through the semiconductor layer from the top surface to the buried-oxide layer;
   wherein the grating trenches are filled with an electro-optical material; and
   wherein the grating teeth are configured as electrodes to apply an electric potential across the electro-optical material to modify an index of refraction of the electro-optical material.

10. The system of claim 9, wherein the modification to the index of refraction changes one of: an operating wavelength of the grating coupler, a position alignment criterion of the grating coupler, and an angular alignment criterion of the grating coupler.

11. The system of claim 9, wherein the semiconductor layer under the grating teeth includes one of: an n-type dopant and a p-type dopant.

12. The system of claim 9, wherein the semiconductor layer under the grating teeth includes a p-type dopant and an n-type dopant; and
    wherein the p-type dopant is included under alternating grating teeth and the n-type dopant is included under grating teeth interposed between the alternating grating teeth.

13. The system of claim 12, wherein the electric potential reverse biases pn-junctions in the semiconductor layer to deplete carriers.

14. The system of claim 9, wherein the grating trenches are etched from the top surface to the buried-oxide layer.

15. The system of claim 9, wherein the substrate, the buried-oxide layer and the semiconductor layer comprise a silicon-on-insulator technology.

16. The system of claim 9, wherein the semiconductor layer includes silicon.

* * * * *

UNITED STATES PATENT AND TRADEMARK OFFICE
CERTIFICATE OF CORRECTION

PATENT NO. : 9,519,163 B2
APPLICATION NO. : 14/034950
DATED : December 13, 2016
INVENTOR(S) : Zheng et al.

It is certified that error appears in the above-identified patent and that said Letters Patent is hereby corrected as shown below:

In the Specification

In Column 5, Line 48, delete "(ax)" and insert -- (δx) --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*